June 30, 1970 S. C. SHORES, JR 3,518,611

CONNECTOR FOR TELEPHONE MAIN DISTRIBUTING FRAME

Filed July 10, 1968 3 Sheets-Sheet 1

INVENTOR
S. C. SHORES, JR.
BY Charles E. Graves

June 30, 1970 S. C. SHORES, JR 3,518,611

CONNECTOR FOR TELEPHONE MAIN DISTRIBUTING FRAME

Filed July 10, 1968 3 Sheets-Sheet 2

June 30, 1970 S. C. SHORES, JR 3,518,611

CONNECTOR FOR TELEPHONE MAIN DISTRIBUTING FRAME

Filed July 10, 1968 3 Sheets-Sheet 3

United States Patent Office 3,518,611
Patented June 30, 1970

3,518,611
CONNECTOR FOR TELEPHONE MAIN DISTRIBUTING FRAME

Stanley C. Shores, Jr., Baltimore, Md., assignor to Bell Telephone Laboratories, Incorporated, Murray Hill and Berkeley Heights, N.J., a corporation of New York Filed July 10, 1968, Ser. No. 743,801
Int. Cl. H01r 25/06
U.S. Cl. 339—18 10 Claims

ABSTRACT OF THE DISCLOSURE

A multipair connector block for use in telephone central offices as the interface between feeder cables and central office equipment is disclosed. The block consists of a mounting panel with large area, consisting of most of its face, devoted to the mounting in vertical array of protector units. Adjacent this area is a vertical array of forward-facing square wire cross-connect terminals which provide time-saving jumper connections. A fanning strip is cast integrally with the panel edge next to the cross-connect terminals. The cross-connect field pattern consists of a 4–4–2 pin count repeated for each row of five protectors and simplifies jumper terminal identification.

This invention relates to terminal apparatus for telephone central office main distributing frames. Specifically, the invention involves an improved connector block for use with such frames.

BACKGROUND OF THE INVENTION

Connector blocks used with main distributing frames are the electrical interface between feeder cables from the exchange area and the central office switching equipment. These connector blocks typically consist of an elongated panel with facilities for mounting up to 100 protector assemblies. The latter provide for each incoming telephone line where necessary voltage and current surge protection for the central office equipment, and also serve as switches to connect and disconnect each line individually. Each block also includes male line test terminals and a field of male terminals for cross-connecting the office side of each protector with wires on the horizontal side of the main frame via so-called jumper wires.

One of the problems with such connector blocks has involved the accessibility to maintenance men of the just-mentioned cross-connecting terminals. In the past, these have been mounted on the sides or rear surfaces of the connector blocks. As it is necessary for each main distributing frame to have as great a termination capacity as possible, any redesign of the connector blocks mounted thereon must be consistent with this end.

Additionally, the dense packing of wire and cable in and around the connector blocks necessitates the orderly handling of all cross-connect jumper wires. No consistent method for achieving this end has heretofore been available. The blocks have included no wire ordering structure.

Further, in working with these blocks, it is necessary for the maintenance man to identify correctly all cross-connect terminals in order to quickly apply the jumper wires. In previous block designs, no geometric visual aid has been made available for this purpose.

Accordingly, one object of the invention is to facilitate the applying of jumper leads in a main distributing frame connector block without decreasing the termination capacity of the frame; and, in fact, if possible increasing same.

An added object of the invention is to package the various elements of a main distributing frame connector in a fashion that optimally conserves space.

Another object of the invention is to decrease the time and cost of routine rearrangement and change work, as well as initial installation work, involved with such connector blocks.

A further object of the invention is to control the handling of jumper wires upon such connectors without adding to the cost of the block.

SUMMARY OF THE INVENTON

The connector of the present invention improves upon its predecessors principally in its vertical arrangement of plug protectors to one side of the face of the mounting panel, thus to make room for an adjacent vertically array of forward-facing square wire cross-connect terminals. A fanning strip is cast integrally with the panel adjacent the cross-connect terminals. The cross-connect field pattern consists of a 4–4–2 pin count repeated for each row of five protectors, significantly simplifying jumper terminal identification.

The above-noted inventive features, and the invention's further objects and specific advantages are illustrated and detailed in the description to follow of a preferred inventive embodiment.

DETAILED DESCRIPTION

The description to follow concentrates upon the structural aspects of the improved connector block, and does not exhaustively treat details of the block's electrical and mechanical connections within the central office. Specifics concerning these are known to all familiar with central offices.

Figure 1:
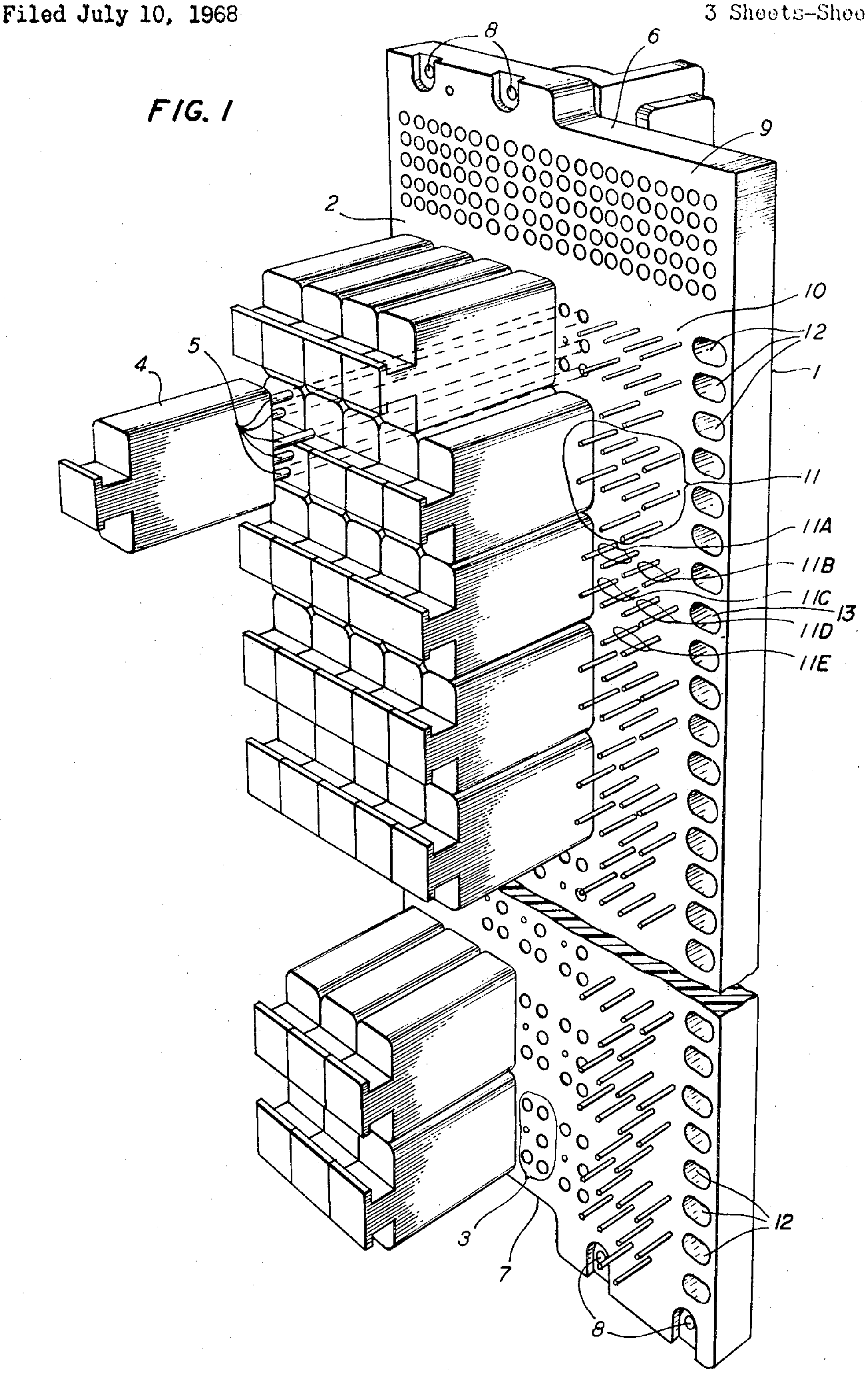
FIG. 1 is a frontal perspective view of a connector block incorporating the present invention.

FIG. 1 depicts a preferred embodiment of the inventive connector, consisting of a panel 1 with a vertical section designated 2 consisting of numerous pin-grip terminals which are arranged in rows and columns of a repeating array denoted 3. Each array 3 of pin-gip terminals receives a conventional plug protector assembly 4 which has several tines 5 arranged in a like configuration. Plug assembly 4 typically is at once a connector and a means for protection from voltage and current surges from without. Plugs 4 are mounted with their long sides vertical in horizontal rows of five and vertical columns of ten, thus making for extremely close-plug packing. The plugs 4 normally used are currently known in telephone parlance as the 3A, 4A and 5A protector units.

To facilitate the mounting and proper positioning of each block 1 on the main frame, block 1 includes a dovetailed slot 6 along its top edge and a mating dovetailed slot 7 along its bottom edge. Typically, the panels 1 are mounted in vertical columns on 8 inch centers of the main frame, with the dovetailed slots 6 and 7 engaging. Bolt holes such as 8 fall in alignment in horizontal rows for connecting of the panels to appropriate bracket nesting, the structure of which is well known in the main frame art.

A cable test field 9 occupies an end region, for example, the topmost region of panel 1 and consists of rows and columns of conventional contacts. The field 9 receives a conventional test shoe which is attached by means of fingers that grip the back edge of the panel. The contacts of test field 9 are paired, each pair being an appearance of a given telephone line. Each contact of test field 9 is connected in routine fashion to a male terminal 18, shown in FIGS. 2 and 3.

To the right of the vertical array of plugs 4, another vertical section denoted as 10 is devoted to forward-facing square wire cross-connect terminals. These terminals are arranged in a repeating matrix, denoted 11. Each matrix 11 consists of a top and middle row of four pins and a bottom row of two pins making a total of ten pins. Specifically, the top row of pins in pattern 11 consists of pin pair 11A and 11B; the middle row consists of pin pairs 11C and 11D and a bottom row of pin pair 11E. Thus, five pin pairs altogether are incorporated in a predetermined pattern which makes up the matrix 11.

Each of the aforementioned five pin pairs in each matrix 11 is electrically connected with a specific one of the plug assemblies 4 in the row of plugs directly adjacent the pin matrix 11. This occurs through connections at the back of the block as will be described shortly. In all connector blocks constructed in accordance with this facet of the invention, a given pin pair position always is associated with a given one of the arrays 3 in the same row. For example, the two pin terminals in each matrix 11 which occupy the upper left-hand positions, namely pins 11A, always are associated with the pin-grip array 3 that services the plug assembly 4 at the far end of the row in question. The positions of each of the pin pairs 11A–11E thus handily indicate to a maintenace man the specific telephone line circuit with which each is associated.

At the far edge of panel 1 a vertical column of elongated slots 12 through the panel to form an integral fanning strip to contain the numerous jumper wires used with the cross-connect terminal matrices 11. Each such slot 12 is directly adjacent a row of the cross-connect terminals. For example, slot 13 is directly adjacent terminal pairs 11C and 11D and serves to control the jumper wires that are connected to those terminal pairs.

Because of the harsh treatment experienced by main frame connectors in practice, the column of slots 12 comprising the fanning strip must be extremely rugged and resist the considerable frictional heat developed as jumper wires are pulled through. The preferred solution to this problem is the choice of a polycarbonate material such as Lexan #2014 for the molded panel 1. This material is fire resistant, heat resistant and unusually durable.

Figure 2:
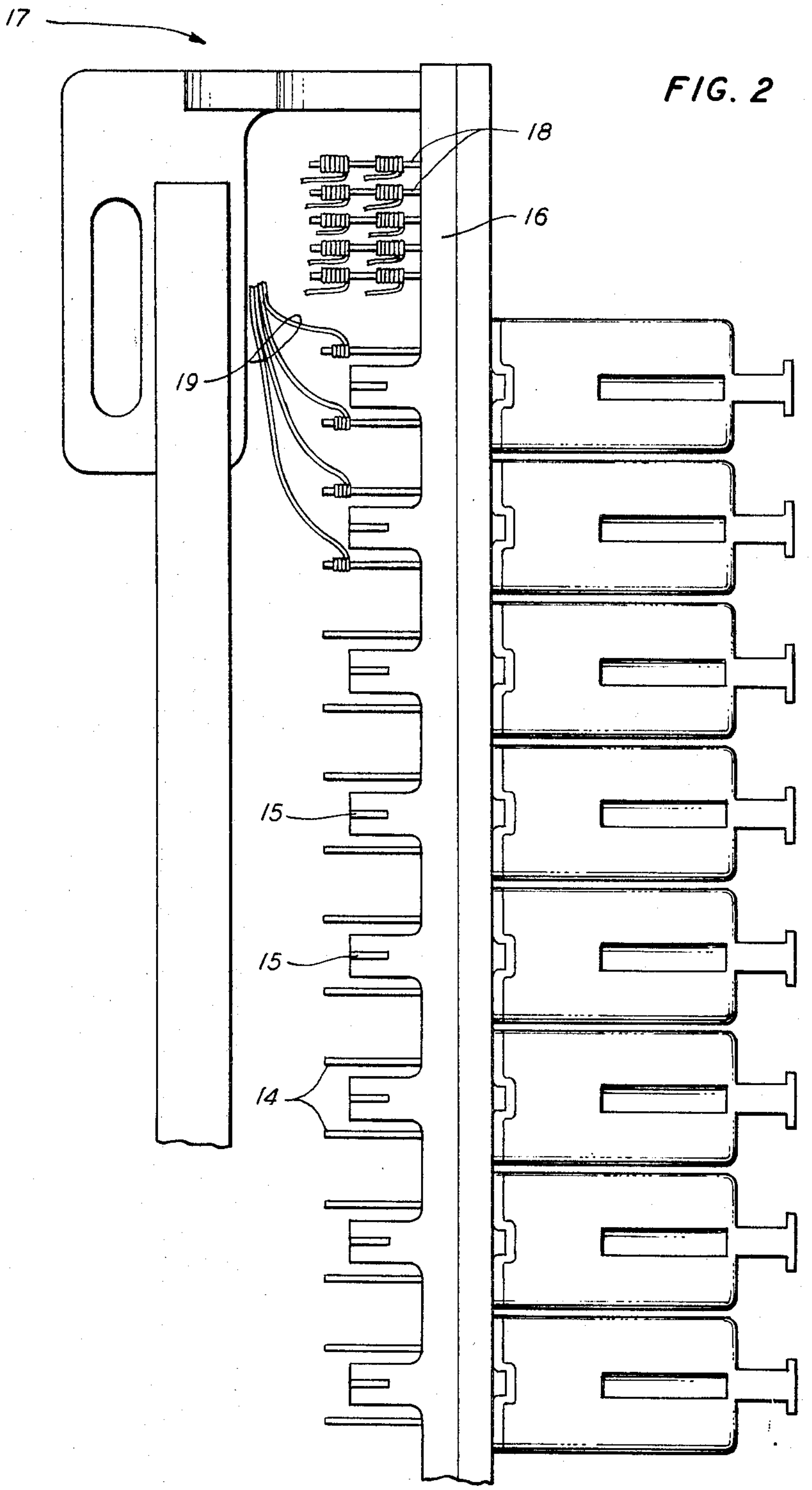
FIG. 2 is a sectional side view of a block of FIG. 1.
Figure 3:
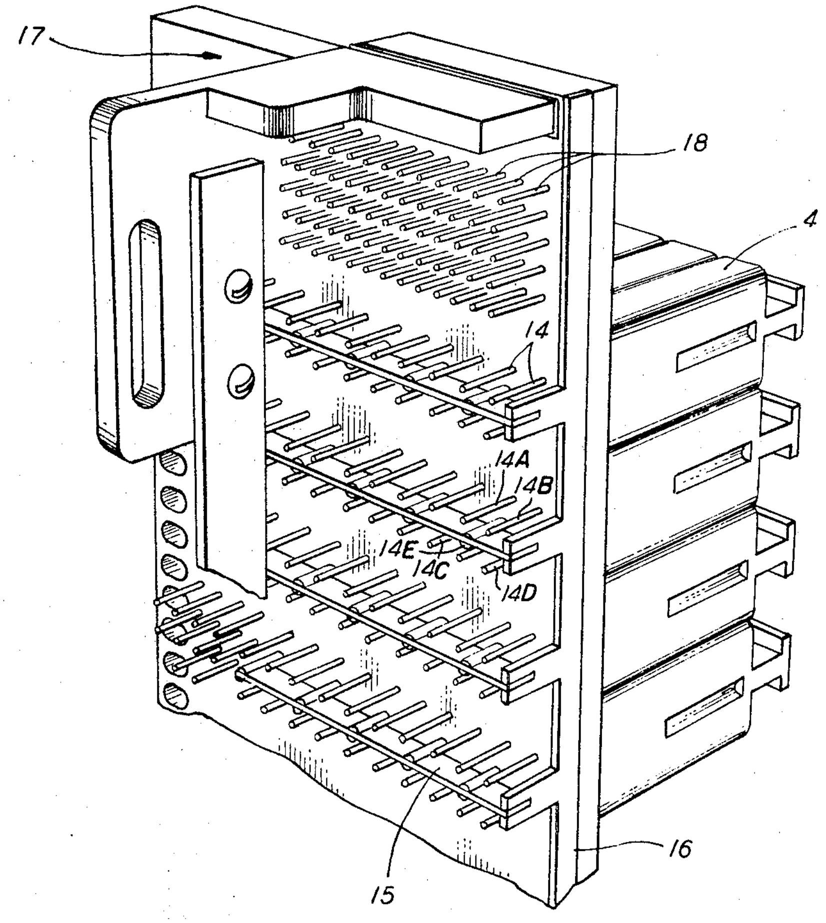
FIG. 3 is a partial perspective rear view of the block of FIG. 1.

The reverse side of panel 11 is illustrated in FIGS. 2 and 3. As is conventional, each of the five pin-grip terminals servicing a plug 4 extends through the panel 1 and forms into a connector terminal each being designated generally with the numeral 14. Similarly, each of the ten terminals in a matrix 11, for example, the terminal pairs 11A–11E, extend through the panel 1 and appear at the back side as also seen in FIG. 3.

The wiring scheme practiced on each block for each telephone line normally is, first, to terminate an incoming line pair on two of the terminals 18 under test field 9. Then, jumpers such as 19 in FIG. 2 are run from the two terminals to the exchange area side of a specific plug-servicing terminal pair, such as 14A, 14B. The central office side of the same plug, represented by terminal pairs 14C, 14D then is connected pursuant to the above-described identification scheme to the back side appearances of the proper two terminals of the matrix 11, for example terminals 11C, 11D, servicing the row of plugs 4. From the front side of the terminals 11C, 11D jumpers are run through the block fanning strip and along the horizontal side of the main frame. Preferably, all terminals are of the solderless-wrap type.

For each of the protector plugs 4, it is conventional to provide a path to ground for one of the associated pin-grip terminals, for example, the terminal 14E. In the present invention, grounding is achieved by a conductive member such as 15 which is run horizontally between the connector terminals 14 associated with a given horizontal row of plug assemblies 4. Member 15 can be a bar, as shown in FIG. 3, or alternatively can be a relatively heavy gauge conductive wire such as a No. 10 gauge copper wire. Each member 15 is electrically and mechanically connected to a vertical grounding bar 16 which is attached to the edge or side of panel 1 in conventional fashion. The grounding bar 16 is electrically and mechanically joined to a bracket assembly 17 which is conventional also. Assembly 17, in turn, is mounted to grounded metallic members of the main frame (not shown).

It is to be understood that the embodiments described herein are merely illustrative of the principles of the invention. Various modifications may be made thereto by persons skilled in the art without departing from the spirit and scope of the invention.

What is claimed is:

1. A connector block for telephone main distributing frames comprising:

an elongated flat rectangular panel;

pin-grip connectors mounted through the panel front face in a pattern consisting of columns and rows of a repeating matrix configuration, the rows and columns occupying a first vertical section of the panel extending from one vertical edge through a major portion of the panel width;

pin terminals occupying a second vertical section of the panel adjacent to said first vertical section, the pin terminals being arranged in groups of like geometry, each group being adjacent to and serving one of said rows; and a plurality of slots between the front and rear panel faces along the panel edge adjacent to said second vertical section, the slots comprising a fanning strip for receiving wires connected to said pin terminals.

2. A connector in accordance with claim 1, wherein the geometry of each said pin terminal group consists of a top and a middle row of four pins each and a bottom row of two pins each.

3. A connector in accordance with claim 2, wherein each individual slot is located adjacent to a given one of the pin terminal group rows, each such row being served by one slot.

4. A connector in accordance with claim 3, wherein said slots are in the shape of elongated holes.

5. A connector in accordance with claim 3 wherein said panels are cast from a heat-impervious insulative material.

6. A connector in accordance with claim 3 wherein the front face of said panel further comprises a field of recessed metallic male line test points extending horizontally across the entire width of a narrow end section of said panel, each test point including a terminal that extends through said panel and out the back face thereof.

7. A connector in accordance with claim 6 wherein each said panel further comprises oppositely dovetailed top and bottom edges, the extending portions of each dovetail being the same in height and including two through holes for receiving fastening means, thereby to allow vertical stacking of successive panels.

8. A connector in accordance with claim 6, further comprising a grounded bracket for mounting said connector, a grounding bar running substantially the entire vertical length of said panel along one side thereof and connecting to said bracket, subsidiary metallic elements connected to said bar and running horizontally beneath each said row of pin-grip connectors, and means for mounting each said metallic element with a clearance between the panel back face and the element and connecting to said bracket.

9. A connector in accordance with claim 8 wherein said metallic elements comprise a #10 gauge copper wire.

10. A connector for telephone main distributing frames, comprising:

an elongated flat panel cast of heat-impervious insulative material, a vertical array of female terminals disposed to one side of the panel's forward face for receiving a plurality of electrical protector elements in rows and columns, a plurality of pin connectors arranged in groups consisting of a repeating geometric pattern, each said group being adjacent to and serving a one of said protector rows, and a plurality of orifices integrally cast in said panel in a single vertical column adjacent said pin connector groups, said orifices comprising a fanning strip for receiving wires connected to said pin connectors.

References Cited

UNITED STATES PATENTS

| | | | |
|---|---|---|---|
| 2,219,887 | 10/1940 | Bowly et al. | 179—98 |
| 2,688,109 | 8/1954 | Holland | 317—122 |
| 2,768,333 | 10/1956 | Dobbratz et al. | 317—122 |
| 2,874,313 | 2/1959 | Githens | 339—18 XR |
| 3,027,418 | 3/1962 | Peterson | 174—72 |

| | | | |
|---|---|---|---|
| 3,181,109 | 4/1965 | Snider | 339—198 |
| 3,253,246 | 5/1966 | McConnell et al. | |
| 3,354,357 | 11/1967 | Jorgensen et al. | 317—119 |

FOREIGN PATENTS

| | | |
|---|---|---|
| 1,348,587 | 12/1963 | France. |

MARVIN A. CHAMPION, Primary Examiner

P. A. CLIFFORD, Assistant Examiner

U.S. Cl. XR.

339—17; 179—98; 317—99; 317—122.